United States Patent [19]

Williams

[11] Patent Number: 5,097,870

[45] Date of Patent: Mar. 24, 1992

[54] COMPOSITE TUBULAR MEMBER WITH MULTIPLE CELLS

[75] Inventor: Jerry G. Williams, Ponca City, Okla.

[73] Assignee: Conoco Inc., Ponca City, Okla.

[21] Appl. No.: 495,053

[22] Filed: Mar. 15, 1990

[51] Int. Cl.⁵ ............................................. F16L 9/18
[52] U.S. Cl. ................................. 138/115; 138/130; 138/144; 138/111; 138/174
[58] Field of Search .............. 138/130, 144, 115, 111, 138/119, 172, 174, 108, 103, 148, 153, 120, 121; 264/108

[56] References Cited

U.S. PATENT DOCUMENTS

| | | | |
|---|---|---|---|
| 2,340,926 | 2/1944 | Bradley | 138/111 |
| 3,379,221 | 4/1968 | Harry et al. | 138/172 |
| 3,554,284 | 1/1971 | Nystrom | 166/250 |
| 3,941,157 | 3/1976 | Barnett | 138/115 |
| 4,057,610 | 11/1977 | Goettler et al. | 138/172 X |
| 4,137,949 | 2/1979 | Linko, III et al. | 138/DIG. 2 X |
| 4,171,626 | 10/1979 | Yates et al. | 138/DIG. 2 X |
| 4,255,820 | 3/1981 | Rothermel et al. | 3/1 |
| 4,530,379 | 7/1985 | Policelli | 138/109 |
| 4,605,385 | 8/1986 | Pück et al. | 138/130 X |
| 4,728,224 | 3/1988 | Salama et al. | 405/195 |
| 4,729,409 | 3/1988 | Paul | 138/115 |

FOREIGN PATENT DOCUMENTS 2014689 8/1979 United Kingdom ................ 138/111

Primary Examiner—Paul T. Sewell
Assistant Examiner—BethAnne Cicconi

[57] ABSTRACT

A composite tubular member having an outer cylindrical member containing fibers oriented to resist internal pressure while providing low bending stiffness, an inner smaller centrally located core member located near the neutral axis of composite tubular member containing fibers oriented to provide high axial stiffness, high tensile stremgth and low bending stiffness and web members containing fibers oriented to resist shear stress, connecting the outer cylindrical member and the inner core member to form at least two separate cells within the composite tubular member.

11 Claims, 4 Drawing Sheets

COMPOSITE TUBULAR MEMBER WITH MULTIPLE CELLS

BACKGROUND OF THE INVENTION

Coiled steel tubing finds a number of uses in oil well operations. For example, it is used in running wireline cable down hole with well tools, such as logging tools and perforating tools. Such tubing is also used in the workover of wells, to deliver various chemicals.

Steel coiled tubing is capable of being spooled because the steel used in the product exhibits high ductility (i.e. the ability to plastically deform without failure). The spooling operation is commonly conducted while the tube is under high internal pressure which introduces combined load effects. Unfortunately, repeated spooling and use causes fatigue damage and the steel coiled tubing can suddenly fracture and fail. The hazards of the operation and the high personal and economic cost of failure in down time in fishing operations forces the product to be retired after relatively few trips into a well. The cross section of steel tubing expands during repeated use, causes reduced wall thickness and results in lower pressure allowables and higher bending strains.

It is desirable to provide a non-steel coil tubing which is capable of being spooled and which does not suffer from the defects of steel tubing.

THE PRIOR ART

U.S. Pat. No. 3,554,284 to Nystrom teaches the use of a logging cable in which two inner layers of fibers are wound at ±18° and two outer layers are wound at ±35°.

U.S. Pat. No. 4,255,820 to Rothermel et al. discloses a prosthetic ligament formed with a densely woven cylindrical core that provides the axial stiffness for the prosthesis.

U.S. Pat. No. 4,530,379 to Policelli teaches a composite fiber tubing with a transition to a metallic connector. The fibers may be graphite, carbon, aramid or glass. These fibers, in one embodiment, are alternatively laid in ±15° orientations to the longitudinal axis. In the FIG. 4 embodiment, "a wider choice of axial angles of filaments in the layers" is permitted. Further, "This embodiment can be employed in a fluid conveyance pipe having bending loads in addition to internal pressure loads and in structural members having bending and axial stiffness requirements". Policelli suggests that the fiber angles can be selected in a range between 5° and 75° as measured from the axis.

U.S. Pat. No. 4,728,224 to Salama discloses a composite mooring tendon on interspersed layers of carbon fibers and aramid fibers, the fibers being axial or low angle helical wrap. A layer of 90° wrap fibers can be provided as an external jacket.

THE INVENTION

In accordance with the invention, composite tubing is provided for use in well logging and workover operations in oil wells. The tubing which is preferably spoolable comprises a composite tubular member having an outer cylindrical member containing fibers oriented to resist internal pressure and provide low bending stiffness, a smaller inner core member located close to the neutral axis of the composite tubular member containing fibers oriented to provide high axial stiffness, high tensile strength and low bending stiffness and web members, containing fibers oriented to resist shear stress, connecting the outer cylindrical member and the inner core member to form at least two separate cells within the composite tubular member

DETAILED DESCRIPTION OF THE INVENTION

Composite fibers (graphite, Kevlar®, fiberglass, boron, etc.) have numerous assets including high strength, high stiffness. light weight, etc., however, the stress-strain response of composite fibers is approximately linear to failure and therefore non ductile. Composite coiled tubing must therefore address the strain limitations in another manner, i.e., by providing a design to meet the requirements with a near elastic response.

Such a composite design must have high resistance to bending stresses and internal pressure. It must also have high axial stiffness, high tensile strength and be resistant to shear stress. All of these properties are combined in the composite tubular member of the invention to provide a coiled tubing which can be bent to a radius compatible with a reasonable size spool.

Figure 1:
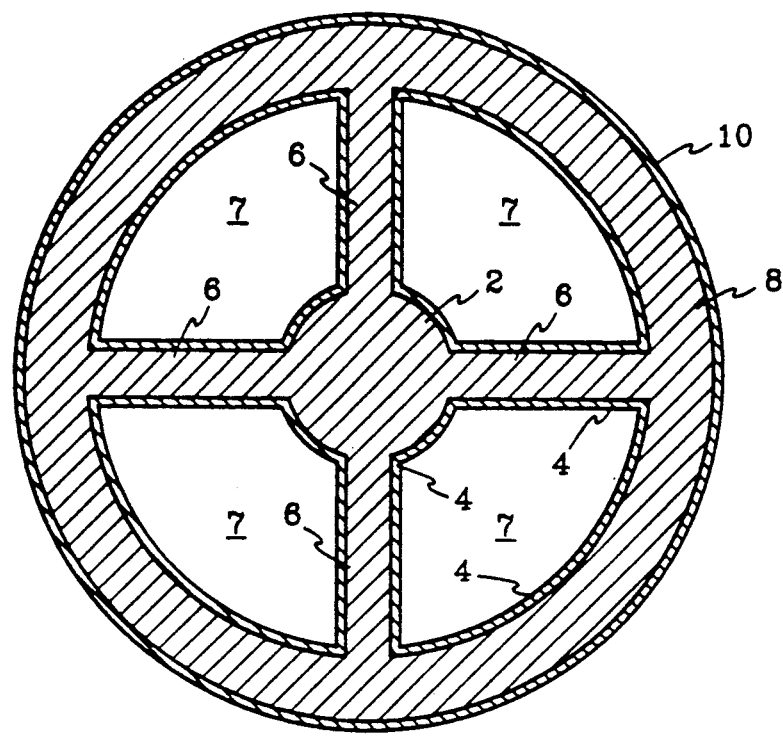
FIG. 1 is a schematic cross-sectional view of a composite tubular member containing four cells of equal cross-section.

The invention is best described by reference to the drawings. FIG. 1 shows a cross-sectional view of a composite tubular member which is made up of a composite cylindrical member 8, a composite inner core member 2 and four composite web members 6 which connect inner core member 2 with composite cylindrical member 8 to form four equal cells 7. Composite cylindrical member 8 contains fibers which are crossplied and oriented at ±55° to the axis of the tubular member. The (±) signifies opposite orientation of the fibers at the degrees indicated. This orientation of the fibers is the optimum to achieve maximum structurally efficiency for outer cylindrical member 8 when such member is subjected to bending and is under internal pressure loading. Outer cylindrical member 8 will usually contain from about 5 to about 10 percent fibers which are oriented at approximately 90°, that is, approximately perpendicular to the axis of the composite tubular member. The inclusion of the 90° fibers lowers the Poisson's ratio of the composite tubular member toward 0.5 and carries the shear stress during bending to better resist delamination in such member.

The inner core member 2 which is centrally located in the composite tubular member contains fibers which are oriented at 0° to the axis of the tubular member to meet the requirement for high axial stiffness and high tensile strength and are so located to permit the composite tubular member to exhibit a low bending stiffness. Concentrating the high axial stiffness portion of the composite tubular member at the center of the cross-section minimizes the axial strain in the fibers during bending. Axial loading and thermal expansion may cause shear and transverse stresses, which may cause cracks in core member 2, therefore it is desirable to provide in this member, some fibers which are cross-plied and oriented at ±45° to the axis of the tubular member to provide resistance to delamination. The ±45° oriented material which may be provided either in the form of a uni-directional or woven fabric or braided material is usually present in inner core 2 in an amount between about 5 and about 25 percent.

Composite web members 6 contain fibers oriented at ±45° to the axis of the tubular member. The web is a region of high shear and a ±45° orientation of the fibers is the optimum angle ply to resist shear loading.

The fibers contained in the outer cylindrical member, the centrally located core member and the web members are held together with a plastic binder such as vinyl ester, epoxy, or a thermoplastic or thermosetting resin.

Economic, structural, damage tolerance and manufacturing considerations may make it advantageous to use fibers of different materials and different resins for the three components of the composite tubular member. For example, the high stiffness and high strength core requirements of the central core member may best be met by using 0° graphite fibers. On the other hand, lower cost and higher strain to failure of glass fibers may make fiber glass the material of choice for the outer cylindrical member and the web members. Other fibers which also may be used are ceramic fibers, polymer fibers, for example, from Kevlar ® polymer which is a product of the Du Pont Company and from Exten ® polymer which is product of The Goodyear Corporation. The plastic binders mentioned, among others may be used in the preparation of the components of the composite tubular member from these materials.

The size of the various components in the composite tubular member will depend on the size of this member. If the composite tubular member is used as coiled tubing, it will usually have a diameter of not more than about 2 inches. The outer composite cylindrical member in a coiled tubing will have a thickness of between about 0.15 and about 0.40 inches. The inner core member of such coiled tubing will have a diameter of between about 0.2 and about 0.5 inches and the web members will be between about 0.10 and about 0.25 inches thick.

Referring again to FIG. 1, it may be desirable to line the interior of each of cells 7 with an abrasion and chemically resistant material 4 to provide a pressure tight chamber. Materials such as Rilsan ® which is sold by ATO Chem, Teflon ®, Kevlar ®, Nylon, and Hytrel ®, sold by Du Pont, or Kevlar ® frit may be used for this purpose.

In service, the composite tubular member may buckle and at the points of buckling, impose a normal force on the walls of the casing or open hole. This force will create friction as the tubular member is moved down the hole. The exterior of the composite tubular member may be covered with a protective abrasion resistant cover 10 to resist such wear and friction. Here again, materials such as Kevlar ®, Teflon ®, Nylon, Rilsan ®, Hytrel ®, or Kevlar ® frit may be used to form this protective covering.

Figure 2:
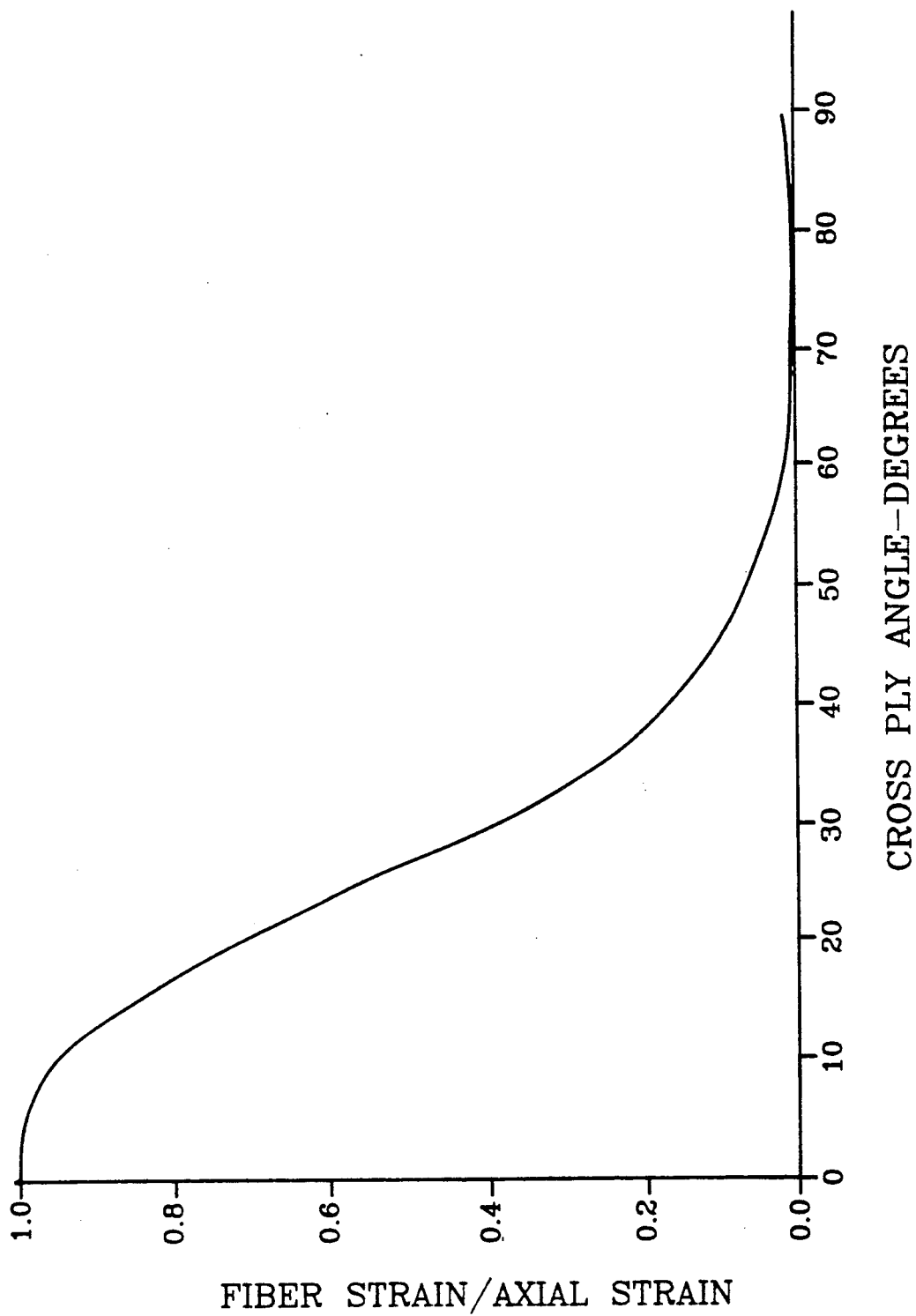
FIG. 2 is a graph showing reductions in the ratio of the strain as a function of increasing the cross-ply angle for a laminate made of high strength graphite fiber.

The axial strain in the fiber due to bending in both the outer cylindrical member and the web members of the composite tubular member is significantly lower than would be similarly placed 0° oriented fibers. Typical reductions in the ratio of fiber strain to the imposed axial strain for a cross-plied laminate presented as a function of the cross-ply angle are presented in the graph of FIG. 2 using representative properties of a high strength graphite fiber. It is noted that for angles greater than approximately ±25° the fiber strain is less than half the axial strain imposed on the laminate and rapidly reduces for larger cross-ply angles. Orienting the fibers in the outer cylindrical member and in the web members in the manner described herein, optimizes the ability of the composite tubular member to carry the imposed set of loads and minimizes the bending strain in the fibers. Minimizing the bending strain in the fibers permits larger diameters for the outer cylindrical member portion of the composite tubular member than would be otherwise possible for a specific diameter spool. Conversely a given diameter composite tubular member so tailored, can be wound onto a smaller diameter spool. The cylindrical shape of the composite tubular member is also well suited for introducing such member into the well with the belt drive mechanism which is normally used to force the tubular member downhole.

The subdivision of the composite tubular member into cells has additional utility for workover and logging operations. Individual cells can be used for transporting different fluids downhole, for controlled circulation (down one cell and up another), and for ducts for channeling electrical and other communication lines downhole. The four cell configuration shown in FIG. 1 provides rigid, structural continuity between the solid core and the composite cylindrical outer member. Under extreme bending, the composite tubular member may experience a so-called brazier flattening effect which serves to help relieve bending strains.

Figure 3:
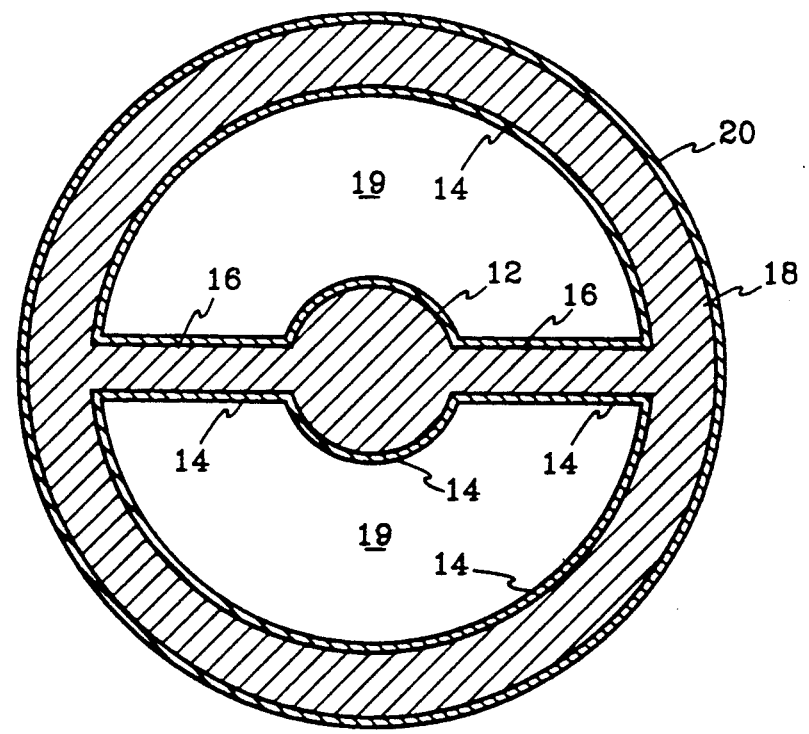
FIG. 3 is a schematic cross-sectional view of a composite tubular member having two separate opposing cells.

Fewer or larger numbers of cells may be used in the cross-section of the composite tubular member. It is possible, for example, to use only two cells. Such a configuration is shown in FIG. 3. In this Figure, the outer composite cylindrical member 18 is joined to the centrally located core member 12 by web members 16 to form two opposing cells 19. The cells are lined with an abrasive, chemically resistant material 14 and the exterior of the composite tubular member is protected by an abrasion resistant cover 20.

One advantage of the composite tubular member shown in FIG. 3 is that the core containing the 0° oriented fibers will assume large displacement away from the center of the cross-section of the composite tubular member during bending along with tube flattening to achieve a minimum energy state. This deformation state has the beneficial result of lowering critical bending strains in the tube. The secondary reduction in strain will also occur in composite tubular members containing a larger number of cells, but is most pronounced for the two cell configuration.

Figure 4:
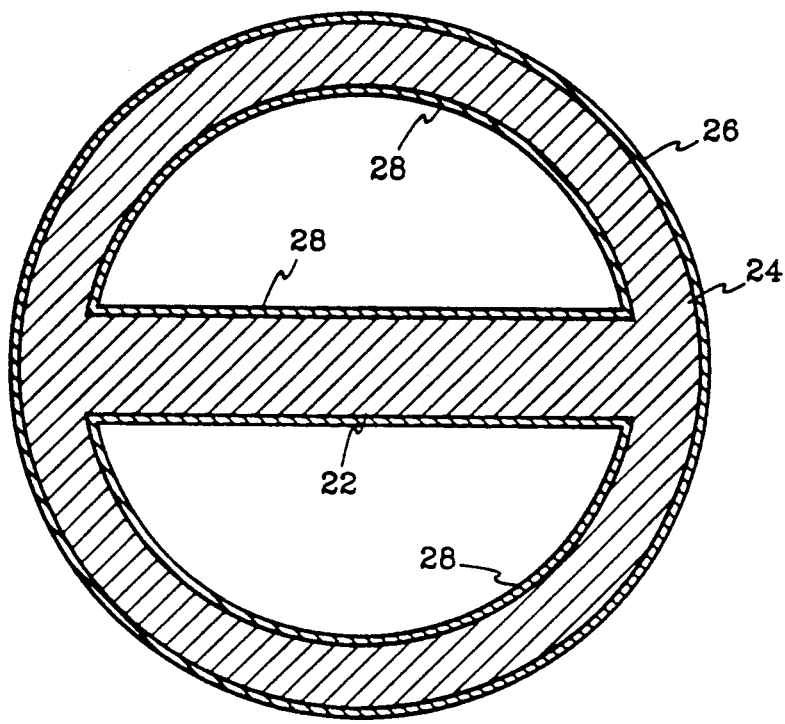
FIG. 4 is a schematic cross-sectional view of a composite tubular member having two separate opposing cells in which the composite web members and the solid core member are combined in a single web member of uniform cross-section extending through the axis of the composite tubular member.

A variation in design in the two cell configuration is shown in FIG. 4 in which the 0° material 22 is widened to provide a plate-like core which extends out to the outer cylindrical member 24 In effect, the central core member and the web members are combined to form a single web member of uniform cross-section extending through the axis of the composite tubular member.

The material tailoring of this invention creates a major and minor moment of inertia and forces a preferred direction of bending. In effect, this forces the composite tubular member to wind onto a spool by bending about the minor moment of inertia. Downhole, the buckle pattern will be a mixed mode having one period associated with the minor moment of inertia and a longer, smaller curvature mode associated with the major moment of inertia. The advantage of this configuration is that more high stiffness and high strength material can be placed in the core without significant increase in the associated bending strains or sacrifice in the minimum radius curvature permitted for spooling.

Figure 5:
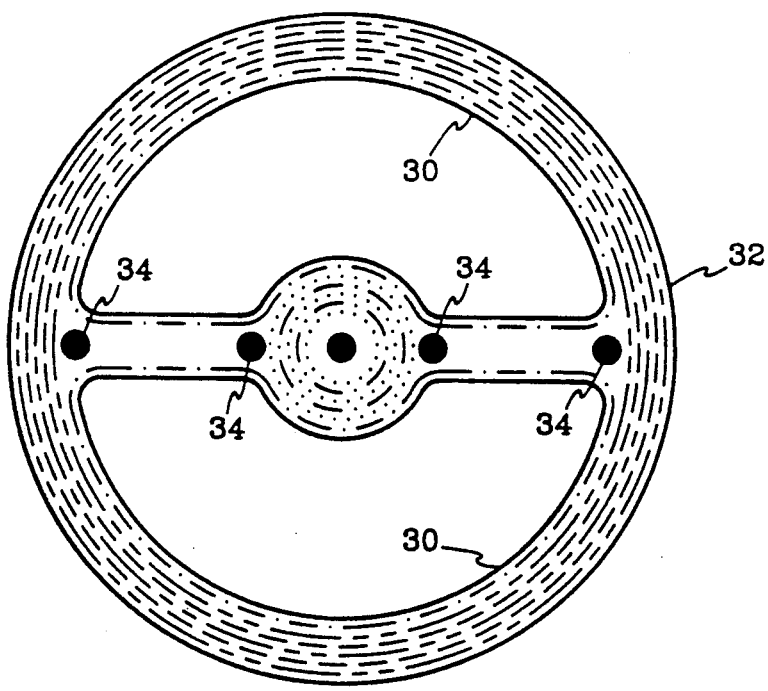
FIG. 5 is a schematic cross-sectional view of a composite tubular member showing the internal arrangement of fibers of differing angularities.

FIG. 5 illustrates the internal arrangement of the fibers for a composite tubular member such as that shown in FIG. 3. Referring to FIG. 5, the angularity of the various fibers in the composite tubular member is represented by single lines as is shown in the legend. Each line represents a number of fiber thicknesses or a number of fiber plies. In FIG. 5, 32 designates the outer abrasive cover, and 30 the inner abrasion and chemically resistant liner for the cells. As shown in the drawing, the central inner core is made up of 0° oriented material and ±45° cross-plied material arranged in a circular configuration. The cross-plied fibers are usually provided in a woven fabric or braided material which as shown, may be extended from the core member to form the web members joining the core member and the outer cylindrical member of the composite tubular member. For structural continuity and sealing at least part of the ±45° web material is continued around the inner portion of the outer cylindrical member to form an enclosed cell. The 0° oriented fiber may also be provided in cloth or fabric form, however, this material is usually present as rovings, i.e. bundles of fibers. Stress concentration may occur in areas where the ±45° fibers in the central core member and the web members make bends that separate the fabric containing these fibers. Concentrations of 0° fibers in these areas, e.g., in the form of rods 34, will provide a local radius and alleviate such stresses. Rods 34 may be formed of a different fiber material than the 0° material contained in the central inner core. As pointed out previously, the outer composite cylindrical member contains primarily ±55° cross-plied fibers with a small amount of approximately 90° oriented fibers. The fibers in the various elements of the composite tubular member are held together or laminated with a suitable plastic binder (previously described) which is not shown in the drawing.

Figure 6:
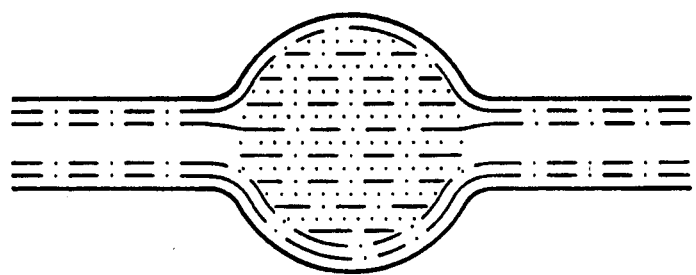
FIG. 6 is a schematic cross-sectional view of the solid core of a composite tubular member showing an alternative internal arrangement of the fibers.

FIG. 6 shows an alternative arrangement of the 0° and ±45° fibers in the inner core of the composite tubular member. While the inner core member has been shown in the Figures as a circular member, it also may be oval shaped. Making the inner core member oval shaped places the material in the core closer to the neutral axis.

Figure 7:
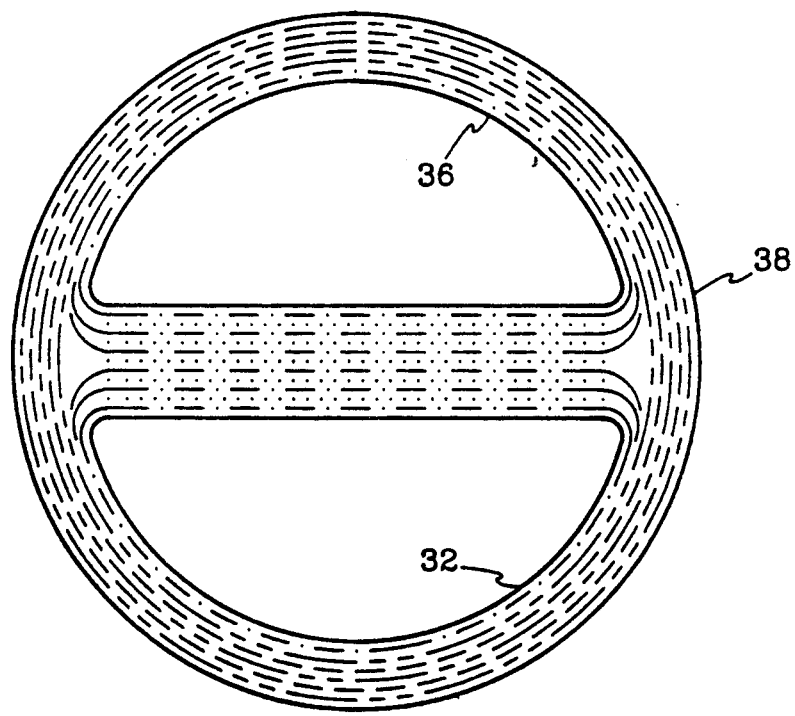
FIG. 7 is a schematic cross-sectional view of another composite tubular member showing the internal fiber arrangement.

FIG. 7 shows the internal arrangement of the fibers for a composite tubular member like that shown in FIG. 4. As in FIG. 6, the fibers of different angularity are represented by the different lines shown in the legend. In FIG. 7, 38 represents the outer abrasion resistant cover covering material for the composite tubular member and 36 represents the liner for the cells in the composite tubular member. The thick web which divides the composite tubular member into two opposing cells is again made up of 0° oriented fibers and ±45° fibers. As in FIG. 5, structural continuity and sealing is obtained by continuing at least part of the ±45° web material around the outside of each cell.

The ±45° fibers which are utilized in the web members and in part in the central core member are of the preferred orientation. However, it is within the scope of the invention to use fibers oriented from ±40° to ±60° in these members. The fibers which are used in the outer composite cylindrical member may vary in orientation from ±40° to ±70° although the ±55° orientation, as previously pointed out, is preferred for some design requirements.

The fiber sequence or stacking sequence of the ±55°, 0°, 90° and ±45° fiber orientations shown in the drawings is only representative and may be varied to meet specific design requirements.

In addition to its use in well logging and well workovers, the composite tubular members of the invention may be used in subsea hydraulic lines or as production tubing in which long sections of tubing are spooled and run downhole for permanent production. One advantage of cells in production tubing is for dual completion wells. Production tubing is normally larger in diameter than is required of coiled tubing and may for onshore use become too large to bend onto a practical diameter spool. If tubing diameters become too large for spooling, it is entirely feasible to manufacture the composite tubular members on site, on shore or offshore. Larger spool sizes are practical offshore where the composite tubular member can be manufactured near a dock site.

Another benefit may be noted for using composite coiled tubular members. With composite coiled tubing, deformations are totally elastic and this stored energy can be constructively used to help free the tubing from a stuck position or high friction bind. The pressure in the tubing can be pulsed to provide the foreseen function. Although this technique may have merit for steel coiled tubing as well as composite coiled tubing, the high stiffness of steel compared to the lower stiffness of the tubular members of this invention limits the magnitude of the local displacements associated with pressure pulsing steel tubing compared to displacements imposed using composite tubing. Activating a seal in the tubing down hole will permit pressure pulsing the composite tubing with a lower pressure imposed on the inside and the outside of the tubing. Pressure pulsing can also aid in freeing the coiled composite tubing stuck downhole.

In forming composite structures, several well known techniques may be used such as pultrusion, filament winding, braiding and molding. In pultrusion, filaments or fibers are drawn through a resin impregnating apparatus, then through dies to provide the desired shapes. Alternatively, the resin may be injected directly within the die. Heat forming and curing means are provided in conjunction with the dies. Finally, the desired product which is produced continuously may be wound onto a reel or spool. As an example, pultrusion is used in U.S. Pat. No. 4,416,329 to prepare a ribbon structure containing bundles of graphite fibers saturated with thermoplastic resin. The faces of the ribbon are covered with plies of woven material, such as glass fabric. Corner tows on the ribbon are made of Kevlar ® or glass. U.S. Pat. No. 4,452,314 uses pultrusion to form arcuate sections comprised of glass filaments or other reinforcing material disposed in a thermosetting resin. The arcuate sections are combined to form a sucker rod.

While any of the known fabrication techniques may be used. pultrusion or pultrusion in combination with braiding or filament winding is the preferred procedure for preparing the composite tubular member of the invention. This procedure is particularly applicable since it enables the composite tubular member to be produced as a continuous product to whatever length is desired. The pultrusion process may utilize material which is prepared by weaving or braiding the fibers. Woven or braided material can be prepared as feed stock or can be fabricated on-line as a part of the pultrusion operation. Pull winding in which some of the material is wound onto the part in advance of the pultrusion dies is another appropriate manufacturing process.

When the composite tubular member is prepared by pultrusion it may be desirable to add some 0° oriented fiber to the outer composite cylindrical member, up to about 10 percent, to aid in the manufacturing process.

While certain embodiments and details have been shown for the purpose of illustrating the present invention, it will be apparent to those skilled in the art that various changes and modifications may be made herein without departing from the spirit or scope of the invention.

I claim:

1. A composite spoolable tubular member having a transverse axis and comprising an outer composite cylindrical member containing fibers cross-plied and oriented at $\pm 40°$ to $\pm 70°$ to the axis of the tubular member, a smaller inner centrally located composite fiber containing member oriented at 0° to the axis of the tubular member and composite web members containing fibers oriented at $\pm 40°$ to $\pm 60°$ to the axis of the tubular member connecting said inner composite member and said composite outer cylindrical member to form at least two separate cells between said web member and said outer cylindrical member.

2. The tubular member of claim 1 in which there are two oppositely disposed composite web members forming two separate cells of equal cross-section in said tubular member.

3. The tubular member of claim 2 in which composite web members and the inner central composite member are combined in a single web member of uniform cross-section extending through the axis of said tubular member.

4. The tubular member of claim 1 in which there are four oppositely disposed composite web members forming four separate cells of equal cross-section in said tubular member.

5. The tubular member of claim 1 in which the outer composite cylindrical member contains from about 5 to about 10 percent fibers oriented approximately 90° to the axis of the tubular member.

6. The tubular member of claim 1 in which the inner central composite member contains from about 5 to about 25 percent fibers oriented $\pm 40°$ to $\pm 60°$ to the axis of the tubular member.

7. The tubular member of claim 1 in which the inner surface of the cells are lined with an abrasion resistant impermeable material and the outer surface of the tubular member is covered with a material resistant to abrasion and having a low coefficient of friction.

8. The tubular member of claim 1 in which the outer composite cylindrical member contains fibers cross-plied and oriented at $\pm 55°$ to the axis of the tubular member, said cylindrical member contains from about 5 to about 10 percent fibers oriented 90° to the axis of the tubular member, the inner central composite member contains from about 5 to about 25 percent fibers oriented to $\pm 45°$ to the axis of the tubular member and the composite web members comprise fibers cross-plied and oriented $\pm 45°$ to the axis of the tubular member.

9. The tubular member of claim 8 in which the composite web members and the inner central composite member are combined in a single web member of uniform cross-section extending through the axis of said tubular member.

10. The tubular member of claim 8 in which there are four oppositely disposed composite web members forming four separate cells of equal cross-section in said tubular member.

11. The tubular member of one of claims 1 to 4 in which the 0° oriented member is made from graphite fibers and the outer composite cylindrical member and composite web members are made from glass fibers.

* * * * *

UNITED STATES PATENT AND TRADEMARK OFFICE
CERTIFICATE OF CORRECTION

PATENT NO. : 5,097,870
DATED : March 24, 1992
INVENTOR(S) : Jerry G. Williams

It is certified that error appears in the above-identified patent and that said Letters Patent is hereby corrected as shown below:

Column 5, line 20, add before "FIG. 5" --In Figures 5, 6, and 7, the broken lines within the bodies of the tubulars indicate the orientation of the fibers in a layer of the tubular. In particular, the dotted lines indicate fibers oriented approximately 0° to the axis of the tubular. Lines formed by alternating dots and dashes indicate fibers oriented approximately ±40° to ±60° to the axis of the tubular. Lines comprised of long dashes separated by two short dashes indicate fibers oriented approximately ±40° to ±70° to the axis of the tubular. Finally, a purely dashed line indicates fibers oriented approximately 90° to the axis of the tubular.--

Signed and Sealed this

Twenty-second Day of March, 1994

Attest:

BRUCE LEHMAN

Attesting Officer     Commissioner of Patents and Trademarks